United States Patent
Martini (10) Patent No.: US 8,819,829 B1
(45) Date of Patent: *Aug. 26, 2014

(54) CONTROLLING NETWORK ACCESS BASED ON APPLICATION DETECTION

(71) Applicant: Phantom Technologies, Inc., San Diego, CA (US)

(72) Inventor: Paul Michael Martini, San Diego, CA (US)

(73) Assignee: iboss, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/906,238

(22) Filed: May 30, 2013

(51) Int. Cl.
 *H04L 29/06* (2006.01)

(52) U.S. Cl.
 USPC .................................. 726/24; 726/3

(58) Field of Classification Search
 USPC ...................................... 726/24, 3
 See application file for complete search history.

(56) References Cited

U.S. PATENT DOCUMENTS

| | | | |
|---|---|---|---|
| 7,225,463 B2 * | 5/2007 | Dusenbury, Jr. | 726/7 |
| 8,056,132 B1 * | 11/2011 | Chang et al. | 726/23 |
| 2003/0084323 A1 * | 5/2003 | Gales | 713/200 |
| 2010/0319053 A1 * | 12/2010 | Gharabally | 726/4 |
| 2013/0042294 A1 * | 2/2013 | Colvin et al. | 726/1 |

FOREIGN PATENT DOCUMENTS

EP 2262173 A1 * 12/2010

OTHER PUBLICATIONS

Hu et al., "Application Identification Based on Network Behavioral Profiles", 2008, IEEE, pp. 219-228.*
Eimann, "Network Event Detection with Entropy Measures", downloaded from the internet at: https://researchspace.auckland.ac.nz/handle/2292/3427 on May 30, 2013, 186 pages.
Layer7, "L-7 Filter Kernel Version HOWTO", Aug. 23, 2008, Downloaded from the internet at: http://l7-filter.sourceforge.net/HOWTO on May 30, 2013, 7 pages.

* cited by examiner

*Primary Examiner* — Matthew Smithers
(74) *Attorney, Agent, or Firm* — Fish & Richardson P.C.

(57) ABSTRACT

This specification generally relates to controlling access of a device to a network based on the detection of a network application running on the device. One example method includes maintaining one or more application profiles, each application profile associated with one or more network activities in a network; detecting one or more network activities associated with a device connected to the network; determining that the one or more detected network activities associated with the device substantially match network activities associated with a predetermined application profile; and denying network access by the device to the network based upon the determination.

20 Claims, 7 Drawing Sheets

CONTROLLING NETWORK ACCESS BASED ON APPLICATION DETECTION

BACKGROUND

This specification generally relates to controlling access of a device to a network based on the detection of a network application running on the device.

In corporate and other networks, devices connected to the network may communicate with resources inside the network, such as internal servers, and with resources outside the network, such as external servers on the public Internet. The devices may also run various software applications that may access the network in various ways. These software applications may include Web browsers (e.g., Microsoft® Internet Explorer, Google Chrome™, etc.), data transfer applications (e.g., BitTorrent), anonymizing applications (e.g., The Onion Router (TOR)), security-avoidance applications (e.g., Ultra-Surf), as well as other software applications.

SUMMARY

In general, one aspect of the subject matter described in this specification may be embodied in systems, and methods performed by data processing apparatuses that include the actions of maintaining one or more application profiles, each application profile associated with one or more network activities in a network; detecting one or more network activities associated with a device connected to the network; determining that the one or more detected network activities associated with the device substantially match network activities associated with a predetermined application profile; and denying network access by the device to the network based upon the determination.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Network owners often face the problem of software applications installed on devices connected to their network generating unwanted, malicious, or otherwise prohibited network traffic. For example, an employee running a BitTorrent client on a company computer could increase the network owner's bandwidth costs considerably, as well as introduce unwanted security risks. With the recent proliferation of mobile devices, many network owners have adopted a Bring Your Own Device (BYOD) approach in which users can access internal networks using personal devices. In such a network, it can be more difficult to identify prohibited software applications, as the network owner may not be in control of or have access to the individual devices so as to detect and handle the prohibited applications (e.g., remove or disable them).

One approach to handling prohibited software applications includes detecting and blocking all application traffic associated with the prohibited application. For example, a solution may be configured to block all messages sent and received by a BitTorrent client, as BitTorrent uses a documented and well-defined network protocol. However, some applications, such as UltraSurf, attempt to thwart this strategy by communicating in many different ways, relying on a security solution not being able to block all the different communications. Such applications may also be updated regularly by developers with different communication behaviors, such that a security solution must be reconfigured to address each new version of the application.

Accordingly, in some implementations, the present solution involves controlling network access of a device based on detecting the presence of a prohibited network application. Rather than attempt to block all traffic related to such a prohibited network application, the present solution may restrict or limit the network access of a device when any indication that the device is running a prohibited application is detected. For example, the present solution may detect that a device on the network has sent a message in a protocol used by BitTorrent. Upon detection of the message, the network access of the device may be restricted accordingly. In another example, the present solution may detect that a device on the network has performed a series of actions associated with the UltraSurf application. Upon making this detection, the network access of the device may be restricted accordingly. In some implementations, restricting network activity of the device may include disconnecting the device from the network entirely. Restricting the network activity of the device may also include blocking access of the device to certain resources, such as certain servers. In some cases, the network access of the device may be restricted for a configured amount of time, after which point the restriction may be lifted. In some implementations, restricting network activity of the device may include associating the device with a restricted network profile that allows access to certain network resources, and blocks access to other network resources.

In some implementations, the present solution may monitor device activity directed to a public network to determine whether to restrict access to a private network. For example, a corporate network may be configured such that a device accessing the Internet may also have access to sensitive internal servers, such as an R&D server. In such a case, the present solution may detect that the device is running a prohibited application (e.g., BitTorrent) that is accessing the Internet, and therefore restrict access to the internal network resources. In some implementations, the device may be permitted to continue accessing the Internet, but may be restricted from accessing the internal network resources for a period of time.

This approach has several potential advantages. The approach may provide improved protection against unwanted software accessing the network. Because the first detection of the application triggers the access restriction, the application cannot simply try multiple communication techniques seeking one that is not blocked. The first communication technique that the solution recognizes as associated with the prohibited application may cause the network access restriction to be enforced. Further, the network owner need not expend as much effort reconfiguring a security solution to block each and every communication technique associated with an application, as any technique associated with the application will trigger the restriction. Moreover, the approach may allow for flexible administration of network policies, especially in BYOD networks, by allowing the network owner to sever access to an internal network while still allowing access to a public network such as Internet browsing.

Figure 1:
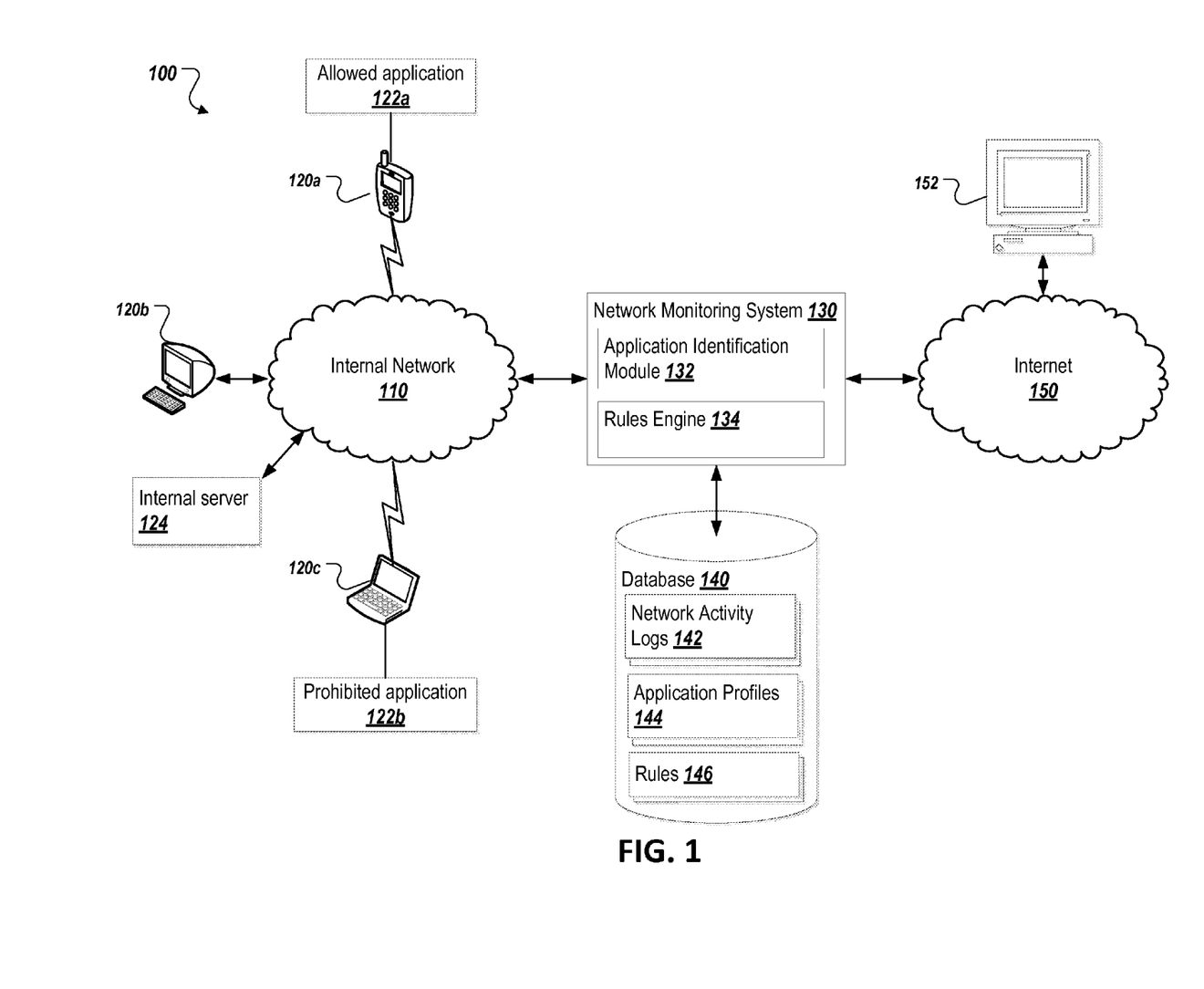
FIG. 1 is a diagram of an example environment.

FIG. 1 is a diagram of an example environment 100 in which various aspects of the subject matter described here may be implemented. The environment includes an internal network 110 separated from the Internet 150 by a network monitoring system 130. One or more devices 120a-c are connected to the internal network 110. A database 140 including network activity logs 142, application profiles 144, and rules 146 is communicatively coupled to the network monitoring system 130. The Internet 150 connects the internal network 110 to various destinations, including destination 152 shown in FIG. 1.

In one example implementation, the network monitoring system 130 monitors network activity to detect the presence of one or more applications, defined by the application profile 144 stored in the database 140. The network monitoring system 130 observes network traffic on internal network 110 looking for activities that are associated with the application profile. For example, sending a message on the network including the string "BitTorrent protocol" may be associated with a BitTorrent application profile, such that a device that is observed sending such a message would be identified as running the BitTorrent application. In some implementations, the network monitoring system 130 monitors all network traffic on the internal network 110, whether it is directed towards the internal resources connected to the network (such as internal server 124), or to external resources connected to the Internet 150, such as destination 152. The network monitoring system 130 may also monitor traffic directed at the Internet 150 and perform application detection based on this traffic.

When the network monitoring system 130 observes a network activity associated with a prohibited application profile, it may access the database 140 to determine from the rules 146 what action to take relative to the offending device. For example, if the network monitoring system 130 detects a network activity associated with prohibited application 122b running on device 120b, and the rule associated with the application profile for prohibited application 122b states that the device should be denied access to the internal network 110 for an hour, then the network monitoring system 130 will configure the internal network 110 to deny access to the device 120b for an hour. In some implementations, the network monitoring system 130 may detect the prohibited application 122b accessing the Internet 150. In such a case, the network monitoring system may restrict the device 120b from accessing resources on the internal network 110 (such as, for example, internal server 124), while still allowing the device to access the Internet 150.

As shown, the environment 100 includes an internal network 110. In some implementations, the internal network 110 may be a wireless network provided by a corporation, educational institution, municipality, business, or other entity. Such a wireless network may utilize any standard wireless networking technology, including 802.11a, 802.11b, 802.11g, 802.11n, LTE, WiMax, CDMA or any other suitable wireless networking technology. In such implementations, the wireless network may be a public network in the sense that any device within range may connect to the network. Such a configuration is often referred to as a Bring Your Own Device (BYOD) network in which users are free to use their own personal devices for connecting to the network. In some implementations, the entity that controls the internal network 110 may issue devices to users for use on the internal network 110. The internal network 110 may also be a wired network, such as an Ethernet network.

The environment 100 also includes one or more devices 120a-c connected to internal network 110. In some implementations, the one or more devices 120a-c include mobile devices, such as cellular telephones (e.g., 120a), smartphones, tablets, laptops (e.g., 120c) and other similar computing devices. The one or more devices 120a-c may also include wired devices such as desktop computer 120b. In some implementations, the one or more devices 120a-c include personal devices associated with one or more users. The one or more devices 120a-c may also include devices issued or owned by the entity that provides the internal network 110, such as company-issued smartphones or laptops. In some implementations, the one or more devices 120a-c may run network access or web browsing software (e.g., a web browser) for accessing resources on the Internet 150.

In the illustrated implementation, the device 120a is shown running an allowed application 122a. In some implementations, the allowed application 122a may be a network application that the network owner does not wish to control using the present solution, such as, for example, because the network application poses no significant security risk. For example, a network owner may decide to allow the use of a web browser program on all devices on the network. In some implementations, the allowed application 122a will have an associated application profile 144 in the database 140. The absence of an application profile 144 associated with the allowed application 122a may also indicate that the application is allowed to operate on the network. In some implementations, the application profile 144 associated with the allowed application 122a will have an associated rule 146 indicating that the application 122a is allowed.

As shown in FIG. 1, the device 120b runs a prohibited application 122b. In some implementations, the prohibited application 122b may be a data-sharing program such as BitTorrent. The prohibited application 122b may also be a security-avoidance program such as UltraSurf. In some cases, the prohibited application 122b may be an anonymizer program such as TOR. The prohibited application 122b may be any application (i) that can be recognized by observing the network activities of the device running the application; and (ii) that the network owner desires to detect in order to restrict the access of the device running it. In some implementations, the prohibited application 122b may be an application the user of the device has knowingly installed, such as the applications listed above. The prohibited application 122b may also be an application installed without the user's consent or knowledge, such as a virus, a botnet client, or a spambot client.

An internal server 124 is also shown connected to the network. In some implementations, the internal server 124 may be any computer or other resource connected to the internal network 110 to which the network owner desires to restrict access. In some cases, devices running prohibited applications (e.g., device 120b) may be prohibited from access the internal server 124 once the application is detected.

For example, if prohibited application 122b running on device 120b is a BitTorrent client, and the internal server 124 is an R&D server owned by the network owner, the network owner may want to prohibit the device 120b from access the internal server 124, as the BitTorrent client represents a path from the sensitive information on the R&D server to the Internet 150. In some implementations, the network access of the device 120b will be restricted entirely such that it will not be able to access any resources connected to internal network 110, not just internal server 124.

The illustrated environment 100 also includes a network monitoring system 130. In some implementations, the network monitoring system 130 is a server connected to the internal network 110 that acts as a gateway between the internal network 110 and the Internet 150. In such a configuration, all network traffic to and from the one or more devices 120a-c and the Internet 150 passes through the network monitoring system 130. The network monitoring system 130 may function as a proxy server in such a configuration. The network monitoring system 130 may also analyze data being sent to and from the one or more devices 120a-c.

The network monitoring system 130 may also be arranged in a tap or span configuration, such that data from the internal network 110 does not flow through it, but instead the network monitoring system 130 monitors the data passively, such as by receiving notifications from another component of data transfers and other network activities.

In some implementations, the network monitoring system 130 includes an application identification module 132. The application identification module 132 may analyze the observed network traffic and compare it against the application profiles 144 in the database 140 to determine whether the network traffic indicates the presence of any of the applications described by the application profiles 144 on the internal network 110. For example, the application identification module 132 may observe the device 120b listening on network port 80. An application profile for a web server application may state that the network activity of listening on network port 80 indicates that a web server is running. Accordingly, in such a case, the application identification module 132 may determine that the device 120b is running a web server, and may provide an indication to the rules engine 134 and/or other components so that appropriate action may be taken (e.g., network access of the device may be restricted). In some implementations, application identification module 132 may examine historical activity information stored in the network activity logs 142 (discussed below) to determine whether an application is running on a device. For example, if the application profile for a web server states that a web server performs the activities of opening port 80 and then sending an HyperText Transfer Protocol (HTTP) 200 OK message, the application identification module 132 may note the first of these activities in the network activity log 142 and then correlate it with the next detected activity to determine that the web server application is running.

As shown, the network monitoring system 130 may include a rules engine 134. In some implementations, the rules engine 134 may perform actions associated with the rules 146 from the database 140. For example, if a certain application is detected running on a device by the application identification module 132, the rules engine 134 may query the database 140 for a rule 146 associated with the application profile 144 for the detected application. In some implementations, the rule 146 may include one or more actions to perform relative to the device on which the application was detected. The rules engine 134 may implement these actions by reconfiguring the internal network 110 or other components of the environment 100. For example, if the rule 146 states that the offending device should be denied access to the network for one hour, the rules engine 134 may associate the offending device with a network profile that causes it to be denied access to the network, and re-associate the offending device with its original profile after an hour. In another example, if the rule 146 states that the offending device should be denied access to the internal server 124, but allowed access to the Internet 150, the rules engine 134 would associate the offending device with an appropriate profile to effect this change. In some implementations, the rule 146 may specify a restricted network profile to associate with the offending device. The restricted network profile may allow the offending device to access certain network resources, and not allow the offending device to access other network resources. For example, in an educational setting, a device that has been detected running a prohibited application may still be allowed to access network resources that are necessary to a class curriculum, but may be prohibited from accessing other sites. Such a configuration may allow the user of the offending device to continue to participate in legitimate activities (such as classwork in an educational setting), while blocking access to other resources.

In the illustrated example, the network monitoring system 130 is connected to a database 140. In some implementations, the database 140 may be stored on the same server as the network monitoring system 130. The database 140 may also be stored on a separate server and accessed by the network monitoring system 130 over a network. The database 140 may be any proprietary or commercially available database system or format, including, but not limited to, MySQL®, Microsoft® SQLServer, IBM® DB2, Oracle®, SQLite, or any other suitable database system or format. The database 140 may also be a distributed database running on a plurality of servers. In some implementations, the database 140 may be a configuration file or set of configuration files associated with the network monitoring system 130. The network monitoring system 130 may examine these configuration files to determine the currently configured application profiles and associated rules.

In some implementations, the database 140 includes a set of network activity logs 142. In some instances, the network activity logs 142 include a historical record of the network activity of the one or more devices 120a-c. For example, a message sent from the device 120b to the destination 152 may be noted in the network activity logs as a record or series of records containing information about the message, such as the time the message was sent, the contents of the message, an indication of the device that sent the message, an indication of the message type, an indication of the application profile associated with the message, or any other suitable information. In some implementations, the rules engine 134 may examine the network activity logs 142 to determine whether a detected network activity, in addition to past activities, indicates that an application associated with an application profile is running on the device that generated the activities. In some implementations, the application identification module 132 may populate the network activity logs 142 based on the observed network traffic from the internal network 110. The network activity logs 142 may also be populated by monitoring messages (such as Simple Network Management Protocol (SNMP) traps) received from various components of the internal network 110.

The database 140 may also include a set of application profiles 144. In some implementations, each of the application profiles 144 define attributes of an application to be detected on the internal network 110. These attributes may include the application name, the network activities that indicate the presence of the application of the device on the network, and any other suitable information about the application. For example, an application profile for a BitTorrent application may indicate the name of the application (e.g., "BitTorrent") and a network activity indicating that the application is running (e.g., sending a message containing the string "BitTorrent protocol"). In some implementations, an application profile 144 may include a series of multiple network activities that may indicate the presence of an application. For example, an application profile for a web server may include the activities of (i) listening on network port 80, and (ii) sending an HTTP 200 OK message. In some cases, an application profile 144 may include a list of multiple network activities, each of which alone will indicate the presence of the application. For example, an application profile for a web browser may include the activities of (i) sending an HTTP GET message, and (ii) receiving an HTTP 200 OK message, each of which alone are sufficient to identify the web browser application. In some implementations, the application profiles 144 may include algorithms to be executed to determine whether a certain application is running. These algorithms may be stored as code snippets or other instructions to be executed by a component (e.g., the application identification module 132) to identify the particular application associated with the application profile 144.

The database 140 may also include a set of rules 146. In some implementations, the rules 146 may each be associated with one of the application profiles 144, and may contain actions to be taken against a device that is determined to be running the application associated with the application profile. For example, a rule associated with a "BitTorrent" application profile may state that the device running the BitTorrent application should be denied access to the internal server 124 on the internal network 110 for one hour. In another example, a rule associated with an "UltraSurf" application profile may state that the device running the UltraSurf application should be denied access to the internal network 110 entirely for one hour, such that the device cannot access the internal network 110 or the Internet 150.

As shown in FIG. 1, the network monitoring system 130 may be connected to the Internet 150. In some implementations, the Internet 150 is the public Internet. The Internet 150 may also be any network or combination of networks accessible from the internal network 110. In such an implementation, the Internet 150 may be replaced by another network or combination of networks, which may be public, private, or a combination of the two. In some implementations, the Internet 150 is a distributed network utilizing the Transmission Control Protocol (TCP) in combination with HTTP to transmit requests to servers connected to the Internet 150, and to transmit responses from the servers to the requesting clients. The Internet 150 may provide connectivity from the internal network 110 to the destination 152.

Figure 2:
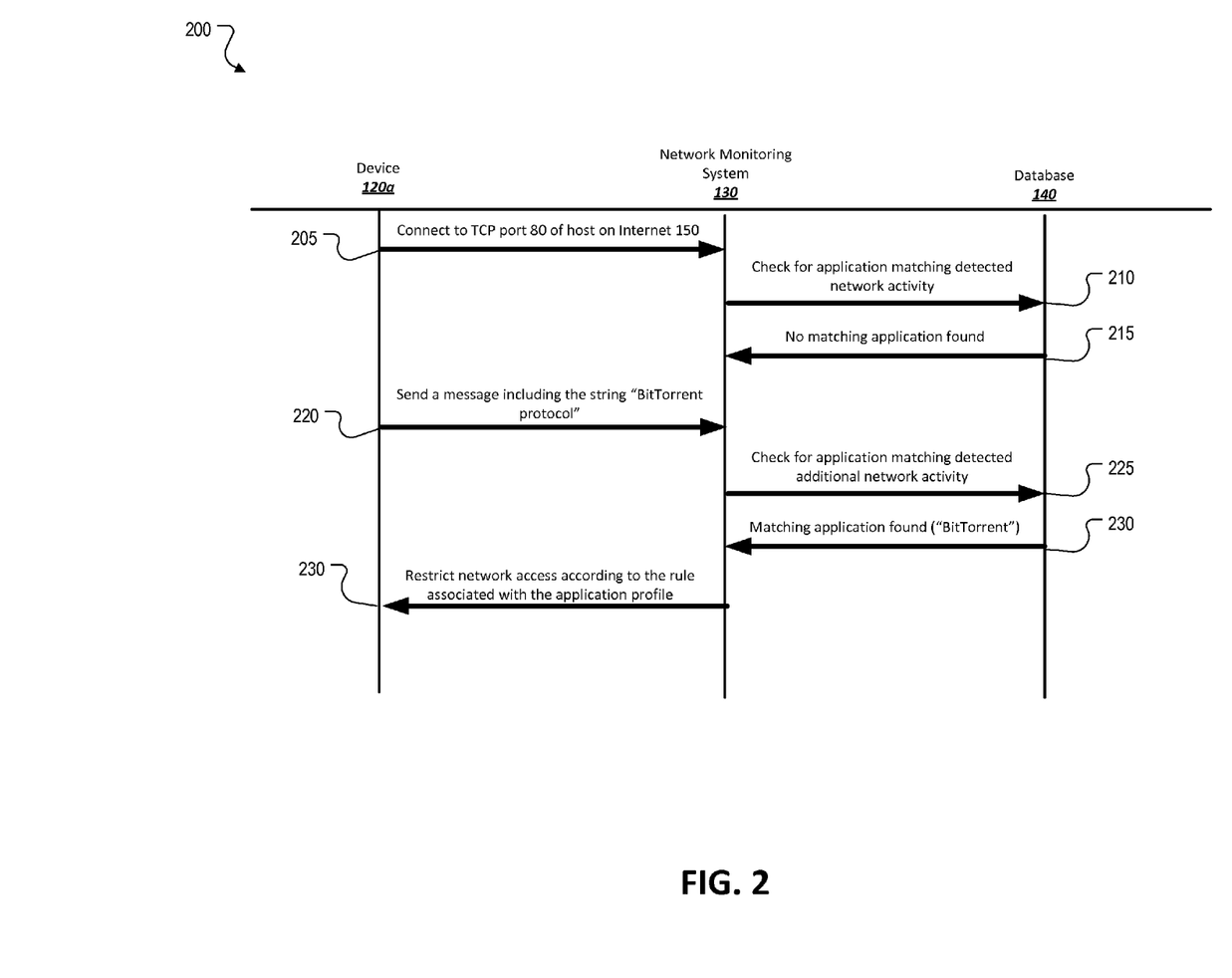
FIG. 2 is a message flow diagram of an example interaction between the components of the example network to control network access based on application detection.

FIG. 2 is a message flow diagram of an example interaction 200 between the components of the example network to control network access based on application detection. In some implementations, the interaction 200 may include additional and/or different components not shown in the message flow diagram. Components may also be omitted from the interaction 200, and additional messages may be added to the interaction 200.

At 205, the device 120*a* attempts to connect to network port 80 of a host on Internet 150. In the illustrated implementation, this activity is detected by the network monitoring system 130. In a tap or span implementation, the activity may be observed by the network monitoring system 130 as it is being sent to the Internet 150 (e.g., as a TCP SYN packet is sent).

At 210, the network monitoring system 130 checks for an application profile matching the activity observed at 205 from the database 140. In some implementations, the network monitoring system 130 requests the application profile by sending a Structured Query Language (SQL) query to the database 140. The network monitoring system 130 may also select matching application profiles directly from the database 140, such as by examining an associated configuration resource such as a configuration file.

At 215, the database 140 responds that no rule corresponding to the observed network activity was found. In some implementations, this response may indicate that no rows were found matching the SQL query. In some cases, such a response may indicate that the network activity is not associated with an application profile. The response may also indicate that an application profile was found, but that the associated rule allows access to the network to devices that are running the application. In such a case, the presence of the application on the device 120*a* may be logged (e.g., in the network activity logs 142 of the database 140).

At 220, the device 120*a* sends a message including the string "BitTorrent protocol." This message is observed by the network monitoring system 130, which, at 225, checks the database for an application profile matching this network activity. At 230, the database 140 responds that a matching application profile ("BitTorrent") was found. In some implementations, the database 140 will also respond with a rule associated with the application profile.

At 230, the network monitoring system 130 restricts the network access of the device according to the rule associated with the application profile. Although 230 shows the act of restriction as a message from the network monitoring system 130 to the device 120*a*, in some implementations the act of restricting may involve messaging additional components of environment 100 (e.g., proxy server, network access controllers, etc.) to implement the configured restriction.

Figure 3:
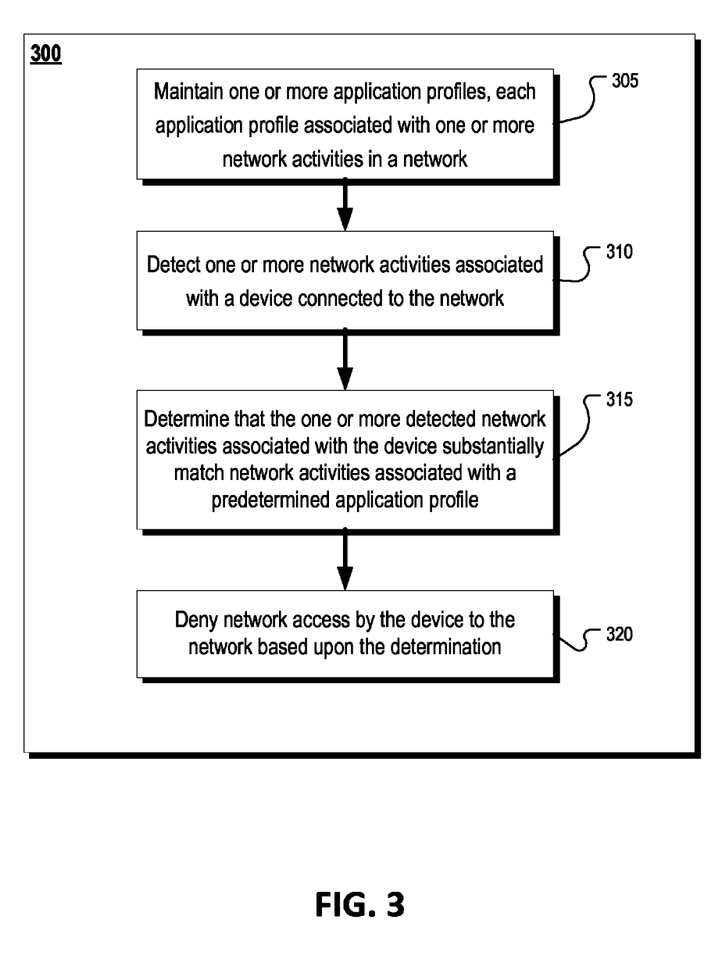
FIG. 3 is a flow chart of an example process of controlling network access based on application detection.

FIG. 3 is a flow chart of an example process 300 of controlling network access based on application detection.

At 305, one or more application profiles are maintained, each application profile associated with one or more network activities in a network. In some implementations, the application profiles are maintained in a database (e.g., 140) and include information about the application such as, for example, network activities that indicate its presence on the network.

At 310, one or more network activities associated with a device connected to the network are detected. In some implementations, the one or more network activities may include communicating via a protocol, communicating to a first port, opening a second port, sending a first message, receiving a second message, or connecting to a certain destination address. In some cases, the one or more network activities may be detected by an application identification module (e.g., 132).

At 315, a determination is made that the one or more detected network activities associated with the device substantially match network activities associated with a predetermined application profile. In some implementations, the determination is made by the application identification module (e.g., 132) comparing the observed activities to activities stored in application profiles (e.g., 144) in a database (e.g., 140).

At 320, network access by the device to the network is denied based upon the determination. In some implementations, a component may reconfigure the network to deny access of the device in response to the determination made at 315.

Figure 4:
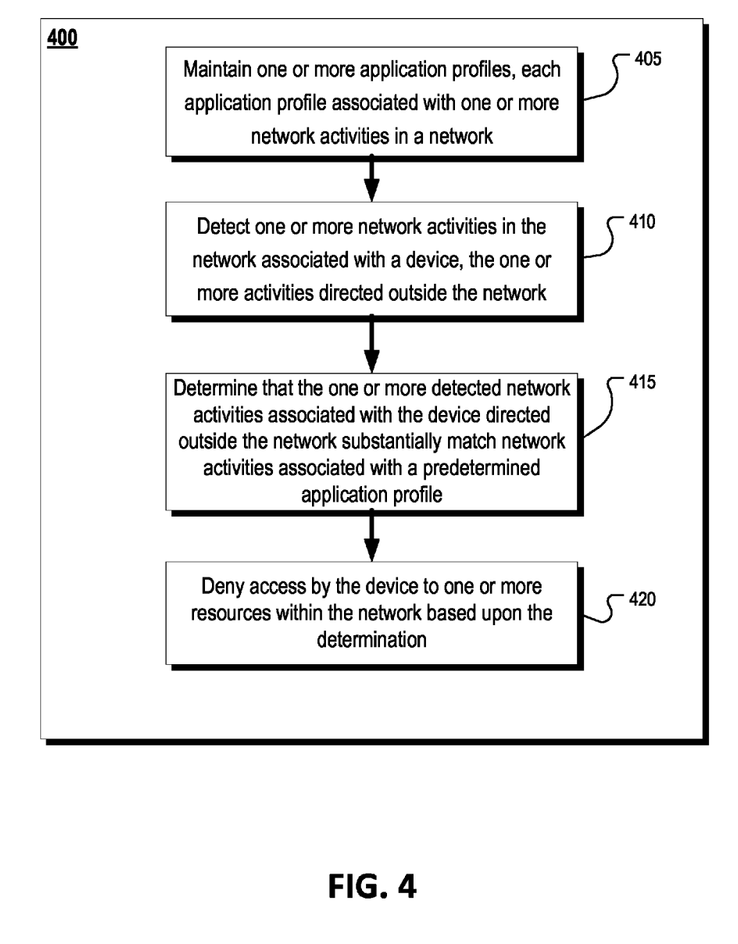
FIG. 4 is a flow chart of another example process of controlling network access based on application detection.

FIG. 4 is a flow chart of another example process 400 of controlling network access based on application detection.

At 405, one or more application profiles are maintained, each application profile associated with one or more network activities in a network. In some implementations, the application profiles are maintained in a database (e.g., 140) and include information about the application such as, for example, network activities that indicate its presence on the network.

At 410, one or more network activities in the network associated with a device are detected, the one or more activities directed outside the network. In some implementations, the one or more network activities may include communicating via a protocol, communicating to a first port, opening a second port, sending a first message, receiving a second message, or connecting to a certain destination address. In some cases, the one or more network activities may be detected by an application identification module (e.g., 132). In some cases, the one or more activities directed outside the network may be activities directed to the Internet (e.g., 150).

At 415, a determination is made that the one or more detected network activities associated with the device directed outside the network substantially match network activities associated with a predetermined application profile. In some implementations, the determination is made by the application identification module (e.g., 132) comparing the observed activities to activities stored in application profiles (e.g., 144) in a database (e.g., 140).

At 420, access by the device to one or more resources within the network is denied based upon the determination. In some implementations, a component may reconfigure the network to deny access of the device to internal network resources (e.g., internal server 124) in response to the determination made at 415.

Figure 5:
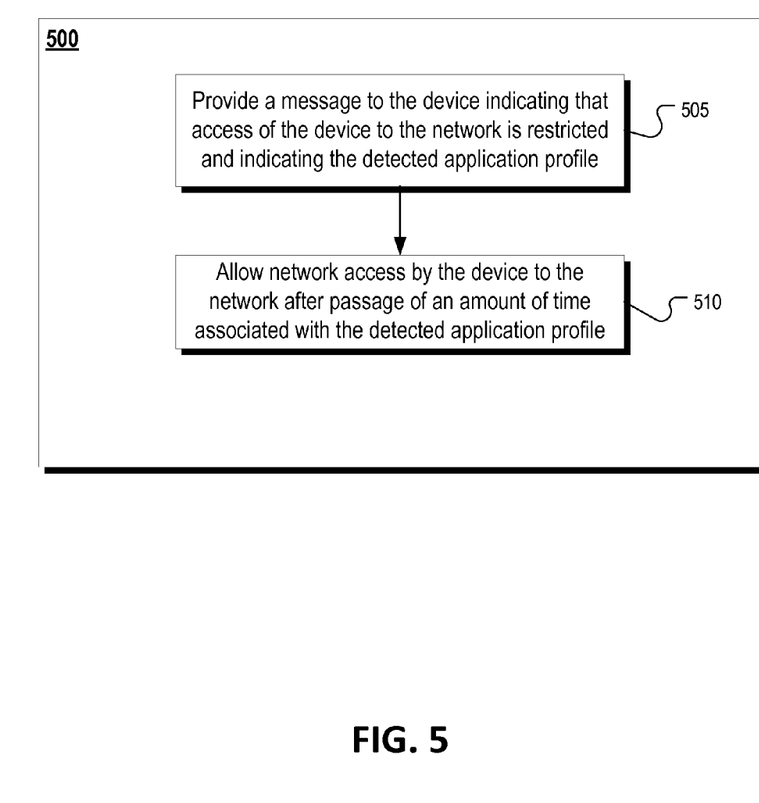
FIG. 5 is a flow chart of an example process of notifying a device of a restriction and removing a restriction after a period of time.

FIG. 5 is a flow chart of an example process 500 of notifying a device of a restriction and removing a restriction after a period of time. In some implementations, the processes 300 and 400 may include one or both of 505 and 510. At 505, a message is provided to the device indicating that access of the device to the network is restricted and indicating the detected application profile. In some implementations, the message is provided in response to an attempt by the device to connect to the network.

At 510, network access by the device to the network is allowed after passage of an amount of time associated with the detected application profile. In some implementations, allowing network access includes a rules engine (e.g., 134) reconfiguring a network (e.g., internal network 110) to allow access by the device.

Figure 6:
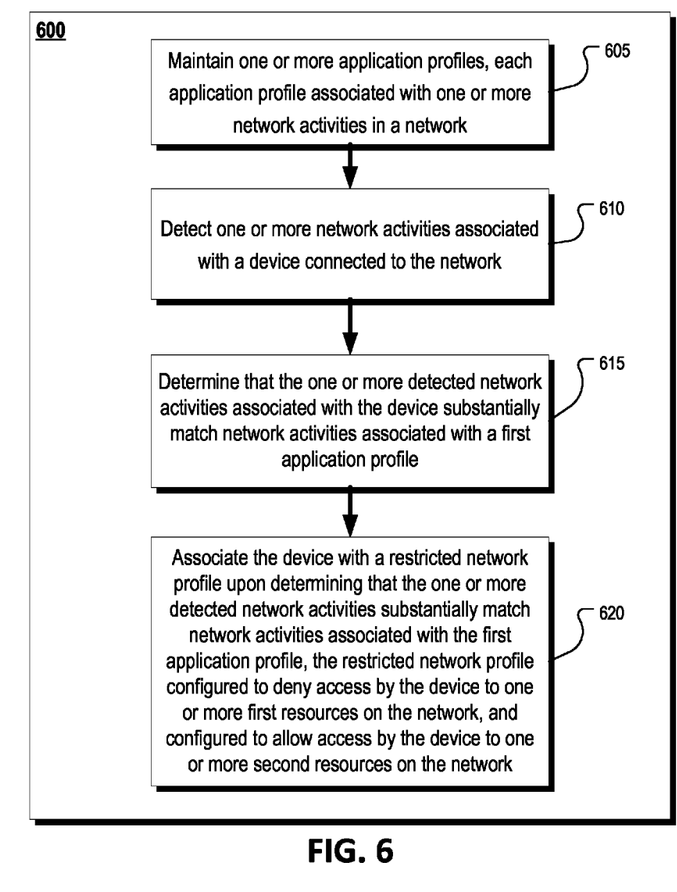
FIG. 6 is a flow chart of an example process for associating a device with a restricted network profile when a prohibited application is detected.

FIG. 6 is a flow chart of an example process 600 for associating a device with a restricted network profile when a prohibited application is detected. At 605, one or more application profiles are maintained, each application profile associated with one or more network activities in a network. At 610, one or more network activities associated with a device connected to the network are detected. At 615, it is determined that the one or more detected network activities associated with the device substantially match network activities associated with a first application profile.

At 620, the device is associated with a restricted network profile upon determining that the one or more detected network activities substantially match network activities associated with the first application profile, the restricted network profile configured to deny access by the device to one or more first resources on the network, and configured to allow access by the device to one or more second resources on the network. In some implementations, the network profile may be configured to block access to resources that are not essential for the user of the device, and allow access to those resources that are essential. For example, the restricted network profile may be configured to allow a student user of a device to access resources that are essential for classwork, such as a class web site, but deny access to other non-essential resources. In some implementations, the device may be associated with the restricted network profile for a period of time. The device may also be associated with the restricted network profile until it is determined that the device is no longer running the application associated with the application profile. For example, the device may be determined to no longer be running the application when the one or more network activities associated with the application profile are no longer detected.

Figure 7:
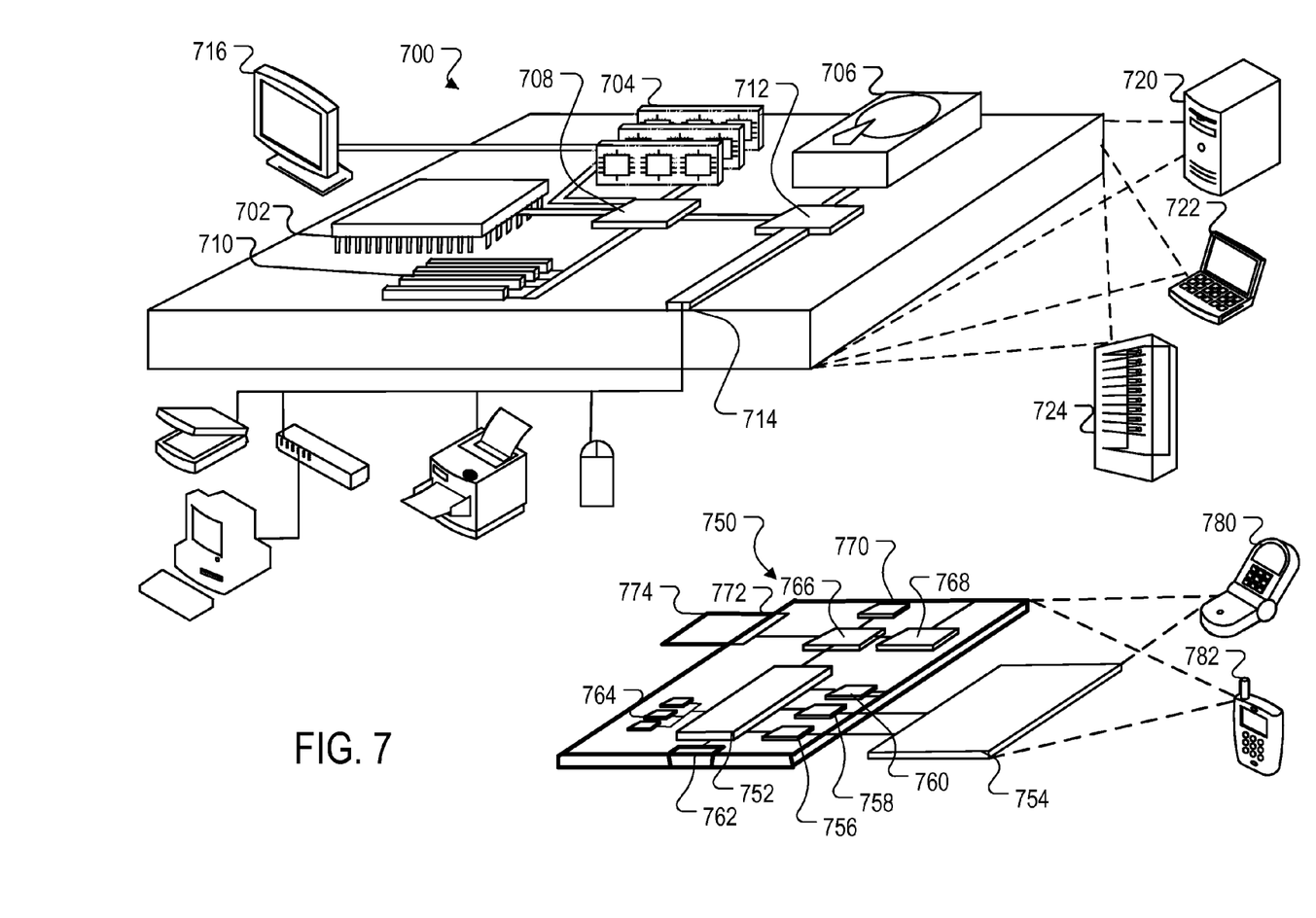
FIG. 7 is a diagram of computing devices that may be used to implement the systems and methods described in this document.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. Additionally computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed interface 708 manages bandwidth-intensive operations for the computing device 700, while the low speed interface 712 manages lower bandwidth-intensive operations. Such allocation of functions is exemplary only. In one implementation, the high-speed interface 708 is coupled to memory 704, display 716 (e.g., through a graphics processor or accelerator), and to high-speed expansion ports 710, which may accept various expansion cards (not shown). In the implementation, low-speed interface 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor 752 may be a CISC (Complex Instruction Set Computers) processor, a RISC (Reduced Instruction Set Computer) processor, or an MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory 764 may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user, as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front-end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method performed by one or more data processing apparatus, the method comprising:
    maintaining one or more application profiles, each application profile associated with one or more network activities in a network, and corresponding to an application configured to execute on one or more devices in the network;
    detecting one or more network activities associated with a device connected to the network;
    determining that an application corresponding to a predetermined application profile is executing on the device based at least in part on the one or more detected network activities associated with the device substantially matching network activities associated with the predetermined application profile; and
    denying network access by the device to the network based upon the determination.

2. The method of claim 1, wherein the one or more network activities include communicating via a protocol, communicating to a first port, opening a second port, sending a first message, receiving a second message, or connecting to a certain destination address.

3. The method of claim 1, wherein the one or more application profiles are each associated with a network application.

4. The method of claim 3, wherein the network application is one of BitTorrent, UltraSurf, The Onion Router (TOR), a botnet client, a spambot client, or a virus.

5. The method of claim 1, wherein detecting one or more network activities includes at least one of analyzing messages sent on the network, analyzing ports open on the network, analyzing connections made from the one or more devices, or analyzing connection made to the one or more devices.

6. The method of claim 1, further comprising allowing access of the device to the network after passage of an amount of time associated with the detected application profile.

7. The method of claim 1, further comprising, upon restricting network access of the device, providing a message to the device indicating that network access of the device is restricted and indicating the detected application profile.

8. The method of claim 1, wherein the predetermined application profile corresponds to a prohibited network application being used on the device.

9. The method of claim 1, wherein the network comprises a private network.

10. The method of claim 9, wherein the one or more activities directed outside the network are directed to a public network.

11. A system comprising:
    a processor configured to execute computer program instructions; and
    a non-transitory computer storage medium encoded with computer program instructions that, when executed by the processor, cause the system to perform operations comprising:
        maintaining one or more application profiles, each application profile associated with one or more network activities in a network, and corresponding to an application configured to execute on one or more devices in the network;
        detecting one or more network activities associated with a device connected to the network;
        determining that an application corresponding to a predetermined application profile is executing on the device based at least in part on the one or more detected network activities associated with the device substantially matching network activities associated with the predetermined application profile; and denying network access by the device to the network based upon the determination.

12. The system of claim 11, wherein the one or more network activities include communicating via a protocol, communicating to a first port, opening a second port, sending a first message, receiving a second message, or connecting to a certain destination address.

13. The system of claim 11, wherein the one or more application profiles are each associated with a network application.

14. The system of claim 13, wherein the network application is one of BitTorrent, UltraSurf, The Onion Router (TOR), a botnet client, a spambot client, or a virus.

15. The system of claim 11, wherein detecting one or more network activities includes at least one of analyzing messages sent on the network, analyzing ports open on the network, analyzing connections made from the one or more devices, or analyzing connection made to the one or more devices.

16. The system of claim 11, the operations further comprising allowing access of the device to the network after passage of an amount of time associated with the detected application profile.

17. The system of claim 11, the operations further comprising, upon restricting network access of the device, providing a message to the device indicating that network access of the device is restricted and indicating the detected application profile.

18. The system of claim 11, wherein the predetermined application profile corresponds to a prohibited network application being used on the device.

19. The system of claim 11, wherein the network comprises a private network.

20. The system of claim 19, wherein the one or more activities directed outside the network are directed to a public network.

* * * * *

UNITED STATES PATENT AND TRADEMARK OFFICE
CERTIFICATE OF CORRECTION

PATENT NO. : 8,819,829 B1  
APPLICATION NO. : 13/906238  
DATED : August 26, 2014  
INVENTOR(S) : Paul Michael Martini

Page 1 of 1

It is certified that error appears in the above-identified patent and that said Letters Patent is hereby corrected as shown below:

On the Title Page:

Column 1, item (71) under Applicant, delete "Phantom Technologies, Inc.", insert -- iboss, Inc. --, therefor.

Signed and Sealed this
Twenty-fourth Day of March, 2015

Michelle K. Lee
*Director of the United States Patent and Trademark Office*